United States Patent [19]

Watson

[11] 4,181,702
[45] Jan. 1, 1980

[54] APPARATUS FOR CONTROLLED CHLORINATION OF WATER WITH AN ALKALI METAL DICHLOROISOCYANURATE

[75] Inventor: Clyde D. Watson, San Jose, Calif.

[73] Assignee: FMC Corporation, Philadelphia, Pa.

[21] Appl. No.: 941,436

[22] Filed: Sep. 11, 1978

[51] Int. Cl.² ............................................. B01D 11/02
[52] U.S. Cl. ................................... 422/265; 422/266; 422/277; 210/62; 210/169
[58] Field of Search ............... 422/261, 264, 265, 266, 422/274, 275, 276, 277, 278, 282, 264 B, 266 H; 137/268; 210/62, 169

[56] References Cited

U.S. PATENT DOCUMENTS

| 429,384 | 6/1890 | Manwaring | 422/265 |
|---|---|---|---|
| 939,131 | 11/1909 | Hensel | 422/276 |
| 1,321,037 | 11/1919 | Hedrick | 422/274 |
| 1,409,248 | 3/1922 | Sevcik | 422/264 B |
| 1,855,990 | 4/1932 | Saks | 422/282 |
| 1,934,304 | 11/1933 | Guth | 422/274 |
| 2,086,937 | 7/1937 | Harborne | 422/266 |
| 2,142,947 | 1/1939 | Kretzschmar | 422/264 B |
| 2,308,612 | 1/1943 | Lehmkuhl | 422/274 |
| 2,826,484 | 3/1958 | Buehler | 422/265 |
| 2,976,129 | 3/1961 | Buehler | 422/265 |
| 3,107,156 | 10/1963 | Fredericks | 422/264 B |
| 3,343,918 | 9/1967 | Moulder | 422/266 |
| 3,468,796 | 9/1969 | Noll | 210/62 |
| 3,684,460 | 8/1972 | Arneson | 422/265 |
| 3,754,871 | 8/1973 | Hessel | 422/266 |
| 3,772,193 | 11/1973 | Nelli | 210/62 |
| 3,792,979 | 2/1974 | Clinton | 422/265 |
| 3,802,845 | 4/1974 | Tepas | 422/264 |
| 3,846,078 | 11/1974 | Brett | 422/264 B |
| 3,853,478 | 12/1974 | Rodgers | 137/268 |
| 3,870,068 | 3/1975 | Dutkewych | 137/268 |
| 3,946,902 | 3/1976 | Stepanek | 422/264 B |
| 4,129,230 | 12/1978 | Billett | 422/266 |

FOREIGN PATENT DOCUMENTS

| 612268 | 9/1961 | Canada | 422/265 |
|---|---|---|---|
| 439506 | 12/1935 | United Kingdom | 422/266 |

*Primary Examiner*—Stephen J. Emery
*Attorney, Agent, or Firm*—Christopher Egolf

[57] ABSTRACT

An apparatus and method for the controlled chlorination of a water supply in which an alkali metal salt of dichloroisocyanuric acid is dissolved to form a concentrated chlorine solution that is slowly released into the water supply. The apparatus contains an internal standpipe, open to the water supply at its bottom end and having water inlet apertures and solution metering apertures in its wall. The natural circulation of water in the standpipe through the solid dichloroisocyanurate charge contained in the apparatus results in chlorination of the water supply at a rate controlled by the size and number of solution metering apertures.

9 Claims, 3 Drawing Figures

APPARATUS FOR CONTROLLED CHLORINATION OF WATER WITH AN ALKALI METAL DICHLOROISOCYANURATE

TECHNICAL FIELD

The present invention relates to an apparatus and method for chlorinating water and, more particularly, an apparatus and method for chlorinating water with an alkali metal salt of dichloroisocyanuric acid.

BACKGROUND ART

Chlorinated isocyanuric compounds, such as trichloroisocyanuric acid and sodium dichloroisocyanurate, have well recognized usefulness as chlorinating agents in the treatment of water, e.g., in swimming pools, providing bactericidal action which disinfects the water and prevents the growth of microorganisms. The advantages of solid chlorinated isocyanuric compounds over gaseous, liquid and other solid chlorinating agents are numerous: ease of handling and storage due to compactness and solid form of such compounds; relatively high available chlorine content; storage stability and resistance to contamination-induced decomposition; and absence of insoluble solid residues upon dissolution in water.

Alkali metal salts of dichloroisocyanuric acid, such as sodium and potassium dichloroisocyanurates, typically are rapidly and completely soluble in water at a temperature of 25° C., dissolving to form a relatively neutral solution of hypochlorous acid and the salt of cyanuric acid. The alkali metal salts of dichloroisocyanuric acid are therefore preferred as chlorinating agents over trichloroisocyanuric and dichloroisocyanuric acids, which are much less soluble in water at a temperature of 25° C. and which are very acidic in aqueous solution.

Although alkali metal salts of dichloroisocyanuric acid may be preferred among the various chlorinated isocyanuric compounds as a solid chlorinating agent, simple and reliable methods have not heretofore been available for dispensing the solid salt or its solution into water at a controlled rate over a long period of time.

Erosion feeders, such as described in U.S. Pat. Nos. 3,390,695 and 3,677,408, provide for the slow dissolution of compressed tablets of trichloroisocyanuric acid by the action of water flowing across the tablets. Such devices are unsuitable for use with the highly soluble alkali metal salts of dichloroisocyanuric acid, since the rapid dissolution of such salts would quickly result in overchlorination of the water.

The various chemical dispensing devices described in the literature as being suitable for the precise metering of solid chlorine-releasing agents into aqueous solution may be characterized as either being relatively complex and expensive or as being unsuitable for use with alkali metal dichloroisocyanurates.

The shortcomings of complex, mechanical chemical dispensing devices such as is described in U.S. Pat. No. 3,802,845 are self-evident: high purchase cost; installation, periodic maintenance, and repair requiring the services of a trained technician; increased likelihood of its mechanical elements (moving parts) needing repair and replacement.

Non-mechanical chemical feeders, such as described in U.S. Pat. Nos. 3,772,193 and 3,754,871 commonly rely on diffusion-controlling barriers to regulate the amount of chlorinated solution dispensed into the water. However, such feeders are often unsatisfactory in providing low level chlorination at a uniform, unvarying rate when alkali metal dichloroisocyanurates are used as the solid chlorinating agent. These non-mechanical feeders are typically ineffectual in coping with the solubilization characteristics of alkali metal dichloroisocyanurates, which exhibit a propensity to form a clay-like mass when contacted with water and resist rapid dissolution unless subjected to agitation of an erosive flow of water.

DISCLOSURE OF THE INVENTION

In accordance with the present invention, there is provided an apparatus and method for dispensing an alkali metal dichloroisocyanurate into a water supply, such as a swimming pool, to chlorinate the water. The apparatus comprises (a) a housing for holding a supply of the alkali metal dichloroisocyanurate, at least the bottom of the housing being in contact with the water to be chlorinated; (b) a standpipe disposed within the housing, attached at its lower end to the housing bottom and extending upwardly therefrom; and (c) a filter medium covering fitted over the standpipe exterior.

The standpipe is further characterized by having at least one solution metering aperture located in its wall proximately to the attached lower end of the standpipe and at least one water inlet aperture located in its wall remotely from the attached lower end, all such apertures being covered by the filter medium covering. Access of water from outside the housing to the standpipe interior is provided for by an orifice in the housing bottom. The apparatus is designed so that in normal use water in the standpipe is maintained at a level sufficient to cover both the solution metering apertures and water inlet apertures.

The apparatus' chlorination rate is controlled by provision of solution metering apertures in the standpipe wall of such size and number so as to provide an active chlorine concentration in the water supply of from 0.5 to 5 ppm. Optionally, means are provided for manually adjusting the size of the solution metering apertures.

The apparatus of this invention may be used by direct immersion of its bottom portion in the water to be chlorinated, with an optional flotation collar controlling the immersion depth. Preferably, the apparatus is used in conjunction with a commercially available swimming pool chlorinator, which chlorinator does not constitute part of this invention. The water to be chlorinated is circulated through a constant-level reservoir in the chlorinator, into which the apparatus is inserted to achieve immersion of its bottom portion.

When the apparatus is placed in the water to be chlorinated, water outside the housing enters via the orifice in the housing bottom and fills a substantial portion of the standpipe, covering both the solution metering apertures and water inlet apertures. Chlorination of the water with the apparatus of this invention is effected by the self-induced natural flow of water contained in the standpipe interior through the water inlet apertures into the housing interior. The alkali metal dichloroisocyanurate contained in the housing interior thereby becomes wetted and at least partially dissolved to form a concentrated chlorine solution.

Concurrently with the flow of water through the inlet apertures into the housing interior, the denser concentrated chlorine solution flows downwards and through the solution metering apertures into the standpipe interior. The concentrated chlorine solution then exits via the orifice in the housing bottom into the water supply outside the housing, the water level in the standpipe remaining at a constant height by the entry of water via the orifice from the water supply outside the housing.

The chlorination rate is controlled by selection of solution metering aperture parameters that maintain sufficient circulatory flow through the apparatus to yield an active chlorine concentration in the water supply of from 0.5 to 5 ppm, preferably 0.5 to 1.5 ppm for swimming pool water. The optional adjustable solution metering apertures facilitate precise chlorination control and are therefore preferred.

BRIEF DESCRIPTION OF THE DRAWINGS

The features and advantages of the apparatus of this invention are better understood by reference to the drawings and accompanying description. In the drawings.

BEST MODE FOR CARRYING OUT THE INVENTION

Figure 1:
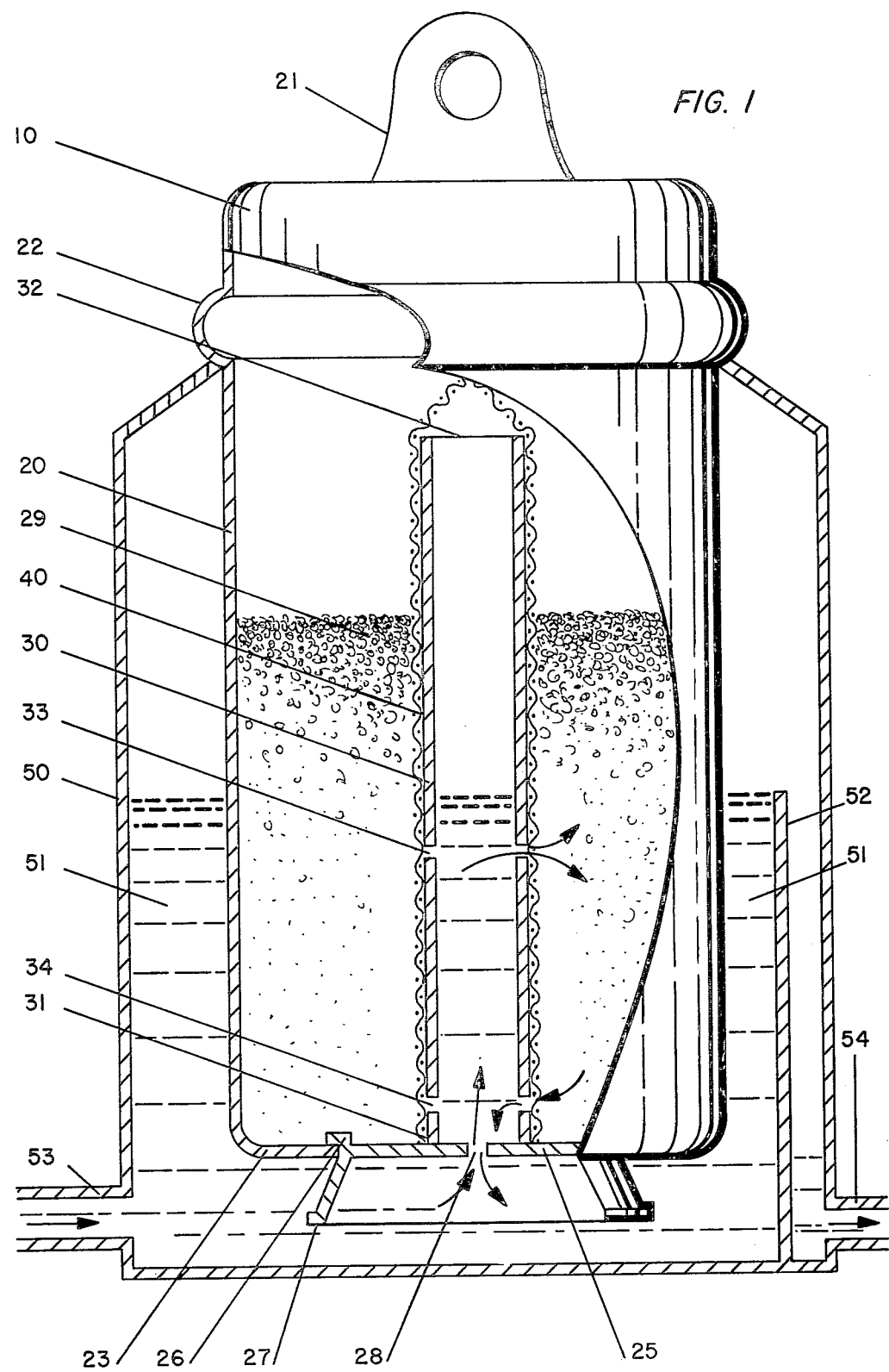
FIG. 1 illustrates one embodiment of the invention as used in a commercially available swimming pool chlorinator, a substantially complete vertical cross-sectional view of this embodiment being shown.

The apparatus of this invention is compact and simple in design, requiring no moving parts, and capable of providing precise and reliable controlled chlorination of water over an extended period of time with a minimum of attention. The simple construction of the apparatus is reflected in the small number of components comprising the device: (1) a housing for holding a supply of solid alkali metal dichloroisocyanurate; (2) a vertical standpipe, located inside the housing and attached to its base; and (3) a filter medium covering fitted over the standpipe exterior.

The component parts of the apparatus are preferably constructed of corrosion- and chlorine-resistant plastics, so as to make the apparatus durable and relatively trouble-free in operation, yet inexpensive to manufacture. The minimal attention required to insure its proper operation and satisfactory chlorination performance facilitates use of this apparatus by a person having no technical expertise, e.g., the average residential swimming pool owner.

The apparatus is designed for chlorinating water supplies by direct immersion of its lower portion in the water to be treated or, alternatively, immersion in a reservoir through which is circulated the water to be treated. When used to chlorinate swimming pool water by being placed directly into the pool water, the apparatus desirably is fitted with a flotation collar or ring which causes the apparatus to float on the pool surface with only its lower portion being immersed in the water.

The apparatus is preferably installed either in the swimming pool skimmer (water intake of the pool recirculation system for continuous water filtration and purification) or in a chlorinator serviced by a by-pass line in the pool recirculation system. In the latter situation, the apparatus is typically used in conjunction with an in-line type water chlorinator, having a water reservoir in which the apparatus of this invention is placed. Water to be chlorinated is passed through the reservoir in the chlorinator so that the immersed lower portion of the apparatus is exposed to and in substantially continual contact with the circulated water.

The apparatus of this invention may be employed satisfactorily with commercial in-line chlorinators such as the E-Z Chlor model R3AF chlorinator (manufactured by Airwick Pool Products, Inc., St. Peters, Mo. 63376) or the Sun Automatic Chlorinator Model 337 (manufactured by Sun Cleanser Co., Livonia, Mich. 48150) for chlorinating swimming pool water. These in-line chlorinators are designed for dispensing a slowly soluble, solid chlorine-releasing compound, e.g., tabletted trichloroisocyanuric acid, from a perforated canister via water-erosion.

In this invention, the size and shape of the apparatus housing are preferably similar to the outer dimensions of the canister which serves as the receptable for solid chlorinating compounds. Thus, the apparatus may be readily substituted for the perforated canister that is usually inserted into the water reservoir of a commercial in-line chlorinator.

The solid chlorine-releasing compound intended for use in the apparatus of this invention is an alkali metal dichloroisocyanurate, also called an alkali metal salt of dichloroisocyanuric acid. Such compounds include the sodium and potassium salts of dichloroisocyanuric acid, in both anhydrous and hydrated forms. Sodium dichloroisocyanurate dihydrate is preferred for use in this invention. When mixed with water, alkali metal dichloroisocyanurates dissolve rapidly and completely to form a relatively neutral solution of hypochlorous acid.

The alkali metal dichloroisocyanurates charged into the apparatus housing are preferably in the form of a granular solid, but powders or compressed tablets may also be used. Solubility-retarding additives or special tabletted configurations to obtain a controlled dissolution rate and release of the chlorine are unnecessary. The alkali metal dichloroisocyanurates may be used full strength in the apparatus of this invention, being free of additives which would dilute the total chlorine content and introduce unwanted contaminants into the water.

A critical feature of the apparatus is its internal standpipe, located inside the apparatus' housing, and attached at its lower end to the housing bottom and extending upwardly from the housing base. The standpipe's characteristics are largely responsible for the successful operation of this chlorination apparatus, as well as its highly satisfactory and reliable performance in chlorinating water with an alkali metal dichloroisocyanurate.

An orifice in the housing base, opening into the standpipe interior, provides for access of water and/or aqueous solution into the standpipe from outside the housing base, and vice-versa. The dimensions of the orifice are not critical inasmuch as the orifice does not serve a flow metering function. The orifice may be as large as the standpipe diameter without adversely affecting the operation of this apparatus. The sole constraint on minimum orifice size is that liquid flow into and out of the standpipe interior not be constricted during normal operation of the apparatus.

In normal operation, the lower portion of the apparatus is immersed in water to a depth which is sufficient to fill a substantial portion of the vertical standpipe length. The standpipe should be long enough to ensure that the level of water inside the standpipe, which is approximately the same as the water level outside the partially immersed apparatus, does not rise above the top end of the standpipe.

A critical feature of the apparatus is the water inlet apertures and solution metering apertures located in the wall of the standpipe. When the apparatus is employed as intended in chlorinating water, water is present in the standpipe, entering via the orifice, at a level which covers the water inlet apertures and solution metering apertures. The solution metering apertures, in particular, are instrumental in controlling the chlorination rate provided by the apparatus of this invention.

The water inlet apertures, which are located in the upper portion of the standpipe wall, allow water within the standpipe to flow into the interior of the housing and contact the alkali metal dichloroisocyanurate contained there. The precise location and configuration of the water inlet apertures in the upper region of the standpipe wall, whether just one or several apertures are used, are not critical.

The water inlet apertures, however, must be sufficient in size and number to permit water to flow readily from the standpipe interior into the alkali metal dichloroisocyanurate charge. Desirably, the size and number of water inlet apertures are such so as to provide a total open area that is at least equivalent to that of the solution metering apertures. Thus, the flow of concentrated chlorine solution through the solution metering apertures will not be limited by the flow rate of water able to pass through the water inlet apertures.

In contrast to the water inlet apertures, the solution metering apertures are located in the lower portion of the standpipe wall, preferably close to the attached lower end. The solution metering apertures allow the passage of concentrated chlorine solution from inside the housing, where the solution is formed by the water contacting and dissolving the alkali metal dichloroisocyanurate, back into the standpipe interior.

The solution metering apertures provide the means in the apparatus of this invention for controlling the chlorination rate. The overall open area provided by the solution metering apertures (determined by their size and number) determines the rate at which the concentrated chlorine solution is released into the standpipe interior and thus, ultimately, the rate at which the treated water is chlorinated.

The size and number of solution metering apertures should be selected to provide a total open area of between 0.5 to 50 mm$^2$, with 1 to 10 apertures providing an open area of between 2 to 25 mm$^2$ being preferred. The solution metering apertures optionally may have variable size openings in order to provide a means for manually adjusting and controlling the chlorination rate obtained.

While the solution metering apertures must be proximate to the attached lower end of the standpipe, their precise location and configuration are not critical. It should be apparent that the number, shape and size of solution metering apertures assume significance only insofar as they affect the overall open area available for fluid flow through the apertures.

The distance between the solution metering apertures and water inlet apertures in the standpipe appears to be important in determining the chlorination rate obtained, although it is not a critically sensitive factor like the overall open area, i.e., size and number, of the solution metering apertures.

The separation between the two sets of apertures apparently induces a natural, circulatory flow of liquid through the alkali metal dichloroisocyanurate in the apparatus. Water in the standpipe flows from the standpipe interior through the water inlet apertures into the alkali metal dichloroisocyanurate charge. Concentrated chlorine solution, formed from the water wetting and dissolving the chlorine-releasing charge, concurrently flows through the solution metering apertures back into the standpipe interior.

It must be emphasized that the manner in which the apparatus of the present invention operates to chlorinate water at a controlled rate, using an alkali metal dichloroisocyanurate as the chlorinating agent, is not clearly understood. The mechanism described in this disclosure is merely one theory as to how the apparatus may in fact function. Such discussion is intended to promote a more complete understanding of the present invention and is not to be construed as a limitation in the apparatus of the claimed invention.

One factor responsible for the controlled chlorination obtained with the apparatus may be the difference in density between water and the highly concentrated chlorine solution. The dense concentrated chlorine solution, formed by the action of the water passing through the water inlet apertures and dissolving the alkali metal dichloroisocyanurate, apparently gravitates downwards inside the housing and flows out into the standpipe interior via the solution metering apertures. There is apparently no appreciable mixing of the concentrated chlorine solution with the water in the standpipe, aside from normal diffusion. The concentrated chlorine solution simply continues to flow downwards, passing out of the standpipe via the orifice in the housing base and thereby chlorinating the water in the reservoir.

The outward flow of concentrated chlorine solution from the housing into the standpipe interior, via the solution metering apertures, appears to induce a corresponding flow of water from the standpipe interior into the housing, via the water inlet apertures. Consequently, this self-induced natural circulation of water through the alkali metal dichloroisocyanurate results in the concentrated chlorine solution being introduced at a relatively constant rate into the water being treated.

The solution metering aperture parameters are chosen within the ranges described in this disclosure so as to provide an active chlorine concentration in the water supply being treated of from 0.5 to 5 ppm, preferably 0.5 to 1.5 for swimming pool water.

The criticality of the solution metering apertures in the apparatus of this invention is supported by experiments in which the solution metering apertures were varied in size and/or number, which resulted in significant chlorination rate changes. On the other hand, experiments in which the water inlet apertures were varied in size, number and location produced no appreciable changes in the chlorination rate.

Elmination of either the solution metering apertures or the water inlet apertures from the standpipe in the apparatus of this invention resulted in a negligible chlorination rate. Similarly, elmination of the entire standpipe, with felted filter cloth being placed over an orifice in the housing bottom, resulted in a negligible chlorination rate.

In addition to the standpipe and housing, the apparatus of this invention contains another component, a filter medium covering which is fitted over the exterior of the standpipe so as to cover the apertures in the standpipe wall. The filter medium covering is preferably constructed as a sleeve or sock and is fabricated from a suitable felt (non-woven), woven or mesh material that is inert and chemically resistant to alkali metal dichloroisocyanurate and its concentrated chlorine solution. Felted polyester, polyethylene or polypropylene filter cloth are preferred as the filter medium material.

The filter medium covering over the standpipe exterior serves several purposes. First, wetting out of the alkali metal dichloroisocyanurate is promoted by the wicking or capillary action of the fiter medium covering. Water flowing into the housing interior through the water inlet apertures appears to be distributed into contact with the alkali metal dichloroisocyanurate by the wicking effect of the filter medium covering, as well as that of the granular alkali metal dichloroisocyanurate charge itself. In this manner, the entire alkali metal dichloroisocyanurate charge is rapidly wetted out, which promotes its dissolution into a concentrated chlorine solution by the water. The wicking action of the filter medium covering may also serve to facilitate the downward movement of the concentrated chlorine solution as it gravitates toward the solution metering apertures in the lower portion of the standpipe.

Secondly, the open mesh or felted character of the filter medium covering acts as a barrier to prevent the wetted out alkali metal dichloroisocyanurate charge from plugging up the water inlet apertures and solution metering apertures. Alkali metal dichloroisocyanurate forms a mudlike, slimy mass when wetted which resists dissolution except when throughly agitated and mixed with the dissolving water.

One embodiment of the apparatus of this invention is illustrated in FIG. 1, in a partially exposed vertical cross-sectional view. The apparatus 10 consists of a housing 20, standpipe 30 and filter medium covering 40.

The apparatus 10 is shown positioned in a commercial chlorinator 50, which chlorinator does not comprise part of the disclosed and claimed invention. The apparatus 10 is readily removable from the opening in the top of the chlorinator 50 where it is presently shown in a fully inserted position.

The chlorinator 50 is characterized by having a water reservoir 51, which is maintained at a constant level by an overflow weir 52. In some commercially available chlorinators (not shown), a float activated control means is used to maintain a constant level water height in the reservoir.

The chlorinator 50 is fed with a continuous flow of water to be chlorinated through an inlet 53, the water flow being supplied by a pump in the water pipeline or from a by-pass line connected to the pool water filter-circulation system or by other analogous liquid circulation means. Water which has been chlorinated by the action of apparatus 10 exits from the water reservoir 51 in the chlorinator 50 by flowing over the overflow weir 52 and out through an outlet 54.

The housing 20 is cylindrical in shape, being adapted for use in the commercial chlorinator 50. The housing is approximately 24 cm in length and has an outside diameter of about 11 cm. Other housing shapes are also feasible and can be employed to facilitate use of the apparatus in specific chlorinators of different design The housing 20 is fabricated from a chemically inert material that resists chemical attack by concentrated chlorine solutions. Preferred materials of construction for the housing 20 are plastics such as polyethylene and polypropylene, which allow the housing to be fabricated as a one-piece molded unit.

The top end of the housing 20 is characterized by having an optional housing tab 21 with a finger hole to permit easy lifting of the apparatus 10 from the chlorinator 50. The top of the housing 20 is desirably fabricated with a means for venting air (not shown), such as a small hole, to permit displacement of air from the housing 20 when the apparatus 10 is immersed in water.

The housing 20 also has a ridge 22 located around its perimeter near the top of the housing. The ridge 22 supports the apparatus 10 in the chlorinator 50 and positions the apparatus at a constant immersion depth in the chlorinator reservoir 51. The ridge 22 also prevents the housing base 25 from resting on or contacting the chlorinator bottom, which would impede the flow of water in the water reservoir 51 to and from the housing base.

When the chlorinator 50 is not used, the ridge 22 may serve as a retainer for a flotation collar, not shown, which allows the apparatus 10 to float free yet be immersed to the desired depth in the water supply being chlorinated.

The housing base 25 is removable and is secured to the housing 20 by recess 26 in its perimeter which is snapped into engagement with the opening in the housing bottom 23 designed to receive the housing base. Alternative means for retaining the housing base 25 in the housing bottom 23, such as a threaded base, are also feasible. The housing base 25 is preferably fabricated from the same materials as the housing 20.

The housing base 25 has a flared foot 27 which supports the apparatus 10 in an upright position, when the apparatus is rested on a level surface after its removal from the chlorinator 50. The foot 27 on the housing base 25 prevents the orifice 28 in the housing base from becoming blocked by dirt or debris when the apparatus 10 is placed upright on a flat surface.

The housing 20 of apparatus 10 holds a charge of an alkali metal dichloroisocyanurate 29, which is preferably sodium dichloroisocyanurate dihydrate in granular form. When the housing 20 is charged with alkali metal dichloroisocyanurate 29, a head space of about 25% of its total volume should be left to allow for expansion of the wetted-out dichloroisocyanurate.

Replenishment of the apparatus 10 with additional alkali metal dichloroisocyanurate after the initial charge 29 has been consumed is accomplished through the opening in the housing bottom 23 via removal of housing base 25 from the housing 20. To recharge apparatus 10, the apparatus if first lifted from chlorinator 50 by means of the finger hole in the housing tab 21. Apparatus 10 is then turned upside down, the housing base 25 removed by snapping it out of the housing bottom 23, additional alkali metal dichloroisocyanurate poured into the upended housing 20 through the opening in the housing bottom, the housing base replaced, and the recharged apparatus restored to the chlorinator 50, as shown in FIG. 1.

In an alternative embodiment, not shown, the top of housing 20 may be fitted with a removable cap, which would obviate the need to remove the apparatus 10 from the chlorinator 50 during the recharging operation.

The embodiment as shown, with the removable base 25 for recharging the solid chlorinating agent, is preferred since the standpipe 30 and filter medium covering 40 can be examined during the recharging operation and, if necessary, washed with water to remove accumulated debris, dirt, scum and like deposits.

The housing base 25 further contains an orifice 28, located approximately at the center of the base, which is of sufficient size to allow for relatively unimpeded liquid flow into and out of the standpipe 30 during the apparatus' operation. As shown by the flow arrows in the drawing, the orifice 28 provides the means for water, outside the housing 20 in the water reservoir 51, to flow into the standpipe 30 and also for concentrated chlorine solution inside the standpipe to flow out into the water reservoir.

The size of the orifice 28 is not critical, but should be at least 1 mm in diameter. An orifice diameter of approximately 3 mm diameter is satisfactory and is preferable to a larger sized orifice. The preferred smaller size orifice 28 minimizes the sudden filling or emptying of the standpipe 30 due to rapid changes in the water reservoir level or due to removal/replacement of the apparatus 10 from the chlorinator 50. Such surges of liquid in the standpipe 30 can lead to upsets in the chlorination rate normally obtained during steady-state operation of the apparatus 10.

Larger orifice openings, up to the inside diameter of the standpipe 30, may be used, if desired, and may optionally be covered with coarse mesh woven filter cloth. Multiple orifice openings of various configurations may be substituted for a single orifice in the housing base 25.

The vertical standpipe 30 shown in FIG. 1 is attached at its lower end 31 to the housing base 25, being securely fastened and sealed around the entire standpipe perimeter. The standpipe 30 as shown is open at its non-attached end 32, but this is not a requirement. The orifice 28 in the housing base 25 provides for access of water and/or solution between the standpipe interior and the water reservoir 51.

The length of the standpipe 30 should be greater than the immersion depth of the apparatus 10 so that the water level in the standpipe 30 remains below the upper end 32. Since the apparatus housing 20 is typically 30–75% submerged in the water to provide the desired level of water in the standpipe, the standpipe legnth should be at least 75% of lengthwise dimension of the housing 20.

The standpipe 30 shown in the apparatus 10 of FIG. 1 has an overall length of 20 cm and an inside diameter of 2.4 cm. The standpipe 30 is preferably of plastic construction, e.g., extruded polyvinylchloride tubing, so as to be corrosion- and chlorine-resistant.

Since the water level in the standpipe 30 remains below the level of its non-attached upper end 32, the upper end may be either open or closed. A standpipe 30 having an open upper end 32 is preferred because it allows ready inspection and cleaning, if necessary, of the standpipe interior when the apparatus 10 is dissembled into its component parts.

The standpipe 30 is further characterized by having water inlet apertures 33 and solution metering apertures 34 in the standpipe wall, the two types of apertures being located in separate regions of the standpipe. The apparatus 10 is designed so that in normal operation both the water inlet apertures 33 and solution metering apertures 34 are covered by water in the standpipe below the water level in the standpipe.

The water inlet apertures 33 are located in the upper portion of the standpipe 30 illustrated in FIG. 1 at a point approximately 6 cm from the attached lower end. The water inlet apertures 33, located remotely from the attached lower end 31 of the standpipe 30, should be at least 5 cm from the attached lower end so as to provide for adequate separation between the water inlet apertures 33 and solution metering apertures 34. Larger separations between the water inlet apertures 33 and solution metering apertures 34 are also feasible and are limited only by the requirement that the water inlet apertures be located below the water level in the standpipe 30 during normal operation of the apparatus 10.

The water inlet apertures 33 consist of three holes, each having a diameter of about 2 mm, spaced equidistantly around the perimeter of the standpipe 30. The three water inlet apertures 33 thus provide an overall open area of about 9 mm$^2$ for flow of water from the standpipe interior into the alkali metal dichloroisocyanurate charge 29 in the housing 20.

The size, number and configuration of the water inlet apertures 33 are not critical, since these apertures are not intended to serve in a metering capacity, i.e., not restricting or limiting the flow of water. The water inlet apertures 33 are preferably between 1 to 3 mm in diameter. The size and/or number of water inlet apertures 33 preferably are sufficient to provide an overall open area at least equivalent to that of the solution metering apertures 34. Water inlet apertures providing from 2 to 50 mm$^2$ open area are typically satisfactory.

The solution metering apertures 34, in contrast to the water inlet aperatures 33, are located in the lower portion of the standpipe 30, about 0.5 to 1 cm from the attached standpipe lower end. The precise location of the solution metering apertures 34 with respect to the attached lower end 31 of the standpipe 30 is not critical, so long as they are located relatively close to the attached lower end.

The configuration of the solution metering apertures 34, if there is more than one such aperture, is likewise not critical. Preferably, the solution metering apertures 34 are all located in the same relative area and are spaced equidistantly around the standpipe perimeter.

The solution metering apertures 34 in the standpipe 30 illustrated in FIG. 1 consist of three holes each having a diameter of about 2 mm which therefore provide a total open area of about 9 mm$^2$ through which the concentrated chlorine solution may flow into the standpipe interior. The solution metering apertures should be between 0.5 to 3 mm in diameter, with the number of apertures being sufficient to provide a total open area of from 0.5 to 50 mm$^2$, preferably 2 to 25 mm$^2$.

The distance between the solution metering apertures 34, in the lower portion of the standpipe, and the water inlet apertures 33, in the upper region of the standpipe, should be at least about 4 cm but may also be substantially greater if desired. The distance separating these apertures appears to be a factor contributing to the self-induced circulation of water flowing through the water inlet apertures 33 into the alkali metal dichloroisocyanurate charge 29, and, concurrently, of concentrated chlorine solution flowing out through the solution metering apertures 34 into the standpipe interior, as shown by the flow arrows in FIG. 1.

A filter medium covering 40, snugly fitted over the exterior of standpipe 30, covers both the water inlet apertures 33 and solution metering apertures 34. The filter medium sleeve covering 40 preferably is constructed as a one-piece sock or sleeve which fits over the exterior of the standpipe 30.

The preferred sock construction of the filter medium covering 40 best serves to promote wicking of the water entering through the water inlet apertures 33 and of the concentrated solution gravitating downwards to the solution metering apertures 34, as well as to prevent the apertures 33 and 34 from becoming plugged or blocked by the wetted-out alkali metal dichloroisocyanurate 23. Alternatively, the filter medium covering 40 may consist of patches or bands of the filter medium material covering all apertures 33 and 34.

Suitable materials for fabricating the filter medium covering 40 include plastic felt (non-woven), woven, or mesh filter media, preferably being selected from polyester, polyethylene or polypropylene felted filter media. Other porous filter materials, such as fiberglass pads or cloth, may also be substituted for the preferred plastic filter media.

The filter medium material is further characterized by having an air porosity of air permeability, measured as the amount of air passing through a unit area of the filter medium in one minute at a pressure drop of 0.5 inch water, within the range of about 10–60 ft$^3$ air/min/ft$^2$ (3–18 m$^3$/min/m$^2$) and a weight ranging from 10 to 25 ounces per square yard (0.34–0.85 kg/m$^2$).

Most preferably, the filter medium sleeve 40 is a sock constructed of felted polyester filter cloth, characterized by having an air porosity of about 15 to 30 ft$^3$/air/min/ft$^2$ (4.5–9 m$^3$/min/m$^2$) at 0.5 inch water pressure and a weight of about 18 ounces per square yard (0.61 kg/m$^2$).

In the embodiment of apparatus 10 illustrated in FIG. 1, the filter medium covering 40 may be inspected for accumulated scum or dirt whenever the apparatus is recharged with alkali metal dichloroisocyanurate 29 and, if necessary, the filter medium may be easily cleaned with water at this time.

Figure 2:
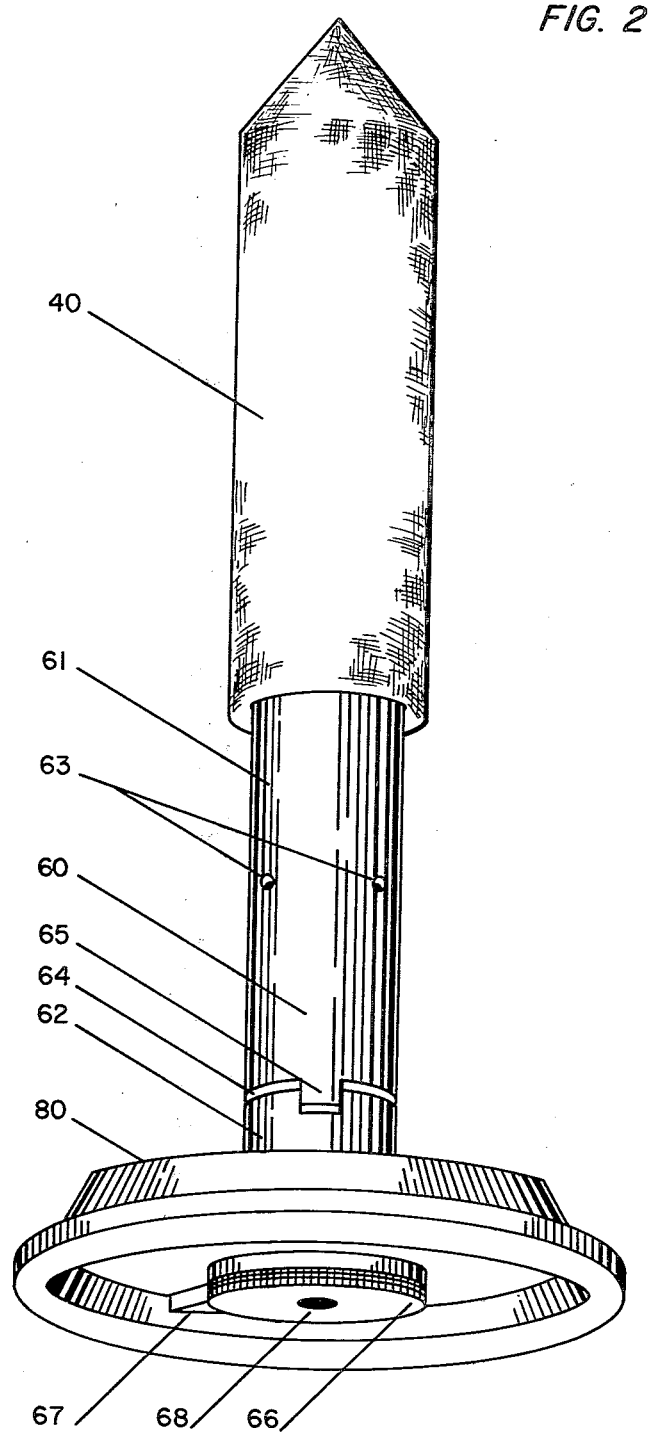
FIG. 2 is a perspective view of a preferred standpipe configuration, having adjustable solution metering apertures, shown in assembled form.
Figure 3:
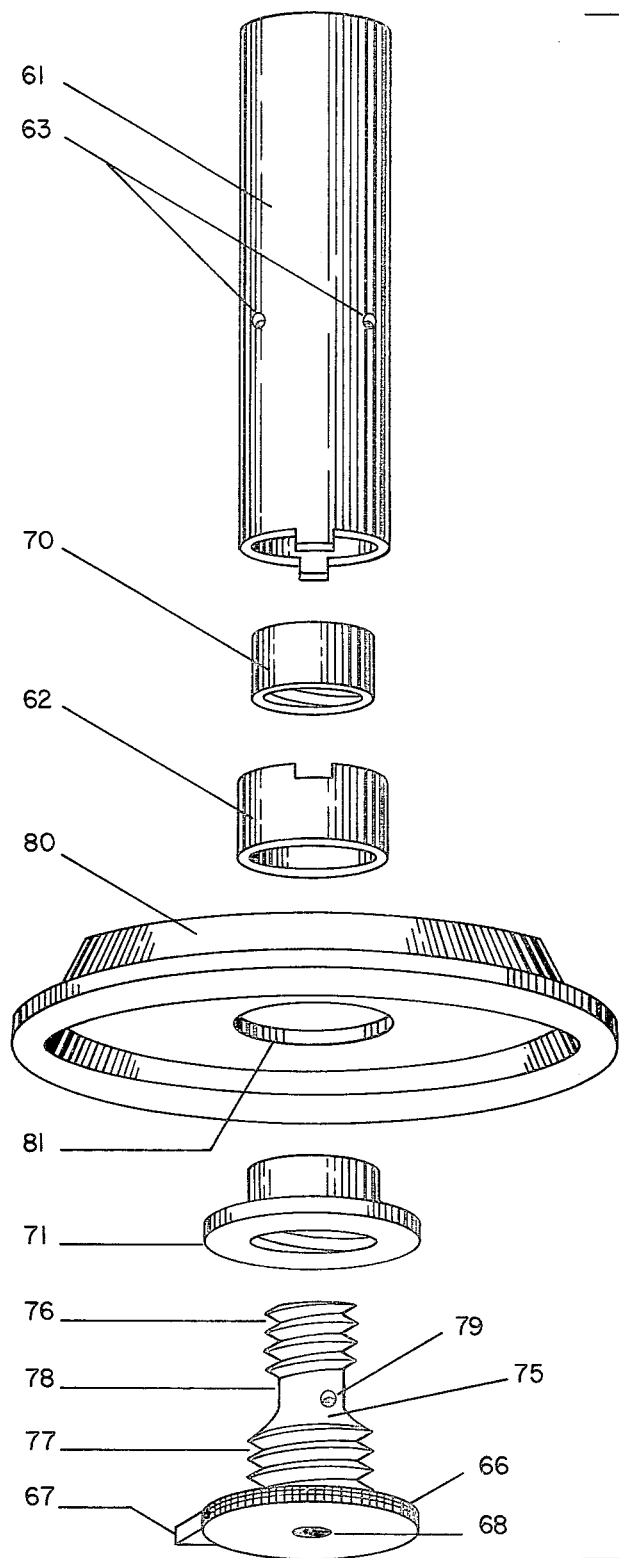
FIG. 3 is an exploded perspective view of the preferred standpipe configuration, illustrated in FIG. 2.

FIGS. 2 and 3 illustrate a preferred embodiment of standpipe having adjustable solution metering apertures. The adjustable solution metering apertures, which provide a means for controlling the open area of the apertures, allow the apparatus' chlorination rate to be varied as desired.

This preferred standpipe embodiment permits precise adjustment of chlorination rate so that the desired chlorine level of from 0.5 to 1.5 ppm available chlorine may be obtained in a swimming pool regardless of the pool capacity or of factors which affect chlorine consumption, e.g., sunlight, bather loading and the like. Furthermore, the preferred standpipe embodiment enables the user of the apparatus to "super chlorinate", i.e., increase the chlorination rate temporarily, for rapidly supplying chlorine-deficient water with chlorine to restore it to the desired available chlorine level.

The modified standpipe with adjustable solution metering apertures illustrated in FIGS. 2 and 3 is readily substituted for the standpipe 30 shown with the apparatus 10 illustrated in FIG. 1.

The preferred standpipe is shown in an assembled perspective view, in combination with a filter medium covering, in FIG. 2 and in an exploded perspective view in FIG. 3.

In FIGS. 2 and 3 identical parts in the two views are identified by the same reference characters. However, the standpipe reference characters in FIGS. 2 and 3 are *not* identical to the reference characters used to describe the corresponding standpipe elements shown in FIG. 1.

The assembled standpipe 60 illustrated in FIG. 2 is characterized by having two tubular portions, an upper standpipe portion 61 and lower standpipe portion 62. The lower standpipe portion 62 is attached at its lower end to the housing base 80. The upper standpipe portion 61 and lower standpipe portion 62 are approximately 19 cm and 1 cm in length, respectively. Both standpipe portions have an inside diameter of about 2.4 cm.

The filter medium covering 40, described previously, is fitted over the full length of standpipe 60 and thus covers both the upper standpipe portion 61 and lower standpipe portion 62. In the drawing, however, the filter medium covering 40 is shown partially removed.

The water inlet apertures 63 are three holes located in the upper standpipe portion 61, about 6 cm from the attached lower end of the lower standpipe portion 62. The three water inlet apertures 63 are each about 2 mm in diameter and are spaced equidistantly around the perimeter of the upper standpipe portion 61.

The solution metering aperture 64 consists of an adjustable slit or gap between the bottom end of the upper standpipe portion 61 and top end of the lower standpipe portion 62. The mating ends of the upper standpipe portion 61 and lower standpipe portion 62 are prevented from rotating with respect to each other by a tongue and notch 65 keying arrangement in the upper and lower standpipe portions 61 and 62, respectively.

The solution metering aperture 64 or, more precisely, the gap or slit created by the vertical separation between the upper and lower standpipe portions 61 and 62, is infinitely adjustable, up to a maximum separation of about 2 to 3 mm. The overall open area provided by the adjustable solution metering aperture 64 may therefore range up to about 25 mm$^2$.

The solution metering aperture 64 is adjusted via a chlorination control knob 66 located underneath the housing bottom 80. The control knob 66 is desirably knurled and optionally has a pointer or indicator 67 which serves as a reference indicator when the gap of the solution metering aperture 64 is varied by turning the control knob 66.

In the center of the control knob 66 is an orifice 68, about 3 mm in diameter, which provides access to the interior of the lower standpipe portion 62 attached to the housing base 80.

The assembled standpipe configuration shown in FIG. 2, when the filter medium covering 40 is fitted completely over the standpipe 60, may be directly substituted for the standpipe, housing base and filter medium covering used in the apparatus illustrated in FIG. 1.

The exploded perspective drawing in FIG. 3 of this preferred standpipe embodiment illustrates the component parts of the standpipe. The means by which the solution metering aperture 64 (shown in the assembled standpipe 60 in FIG. 2) may be precisely adjusted in this standpipe embodiment is best understood by reference to FIG. 3.

In FIG. 3, the upper standpipe portion 61, in addition to those features described in connection with FIG. 2, is further characterized by having an upper insert ring 70. The upper insert ring 70 has an outside diameter which permits its insertion into the bottom end of the upper standpipe portion 61, where it is permanently fastened (for example, with adhesive). The inside of the upper insert ring 70 is threaded, being designed to receive the upper threaded section 76 of the control unit 75 described below.

The overall length of the upper insert ring 70 is relatively short in comparison to the upper standpipe portion 61, preferably being about 1–2 cm.

The lower standpipe portion 62 in FIG. 3 is attached to the housing base 80 via a lower flanged insert ring 71.

The lower flanged insert ring 71 has an outside diameter which permits it to be passed through an opening 81 in the housing base 80, and snugly inserted into the bottom end of the lower standpipe portion 62. The lower flanged insert ring 71 is then permanently fastened (for example, with adhesive) to the housing base 80 and to the lower standpipe portion 62.

The lower flanged insert ring 71 is threaded on the inside, being designed to receive the lower threaded section 77 of the control unit 75.

Like the upper insert ring 70, the lower flanged insert ring 71 is also short in length (preferably about 1 cm), so as not to interfere with the solution metering aperture formed by the mating ends of the upper and lower standpipe portions 61 and 62.

If desired, the number of standpipe components may be reduced by fabricating the lower standpipe portion 62 and lower flanged insert ring 71 as a single unit. Alternatively, the housing base 80 may be constructed with elements of the lower standpipe portion 62 and lower flanged insert ring 71 incorporated into the base as a one-piece design.

The control unit 75 provides the means for adjusting the solution metering aperture, i.e., the gap between the mating ends of the upper standpipe portion 61 and lower standpipe portion 62 in the assembled standpipe. Elements of the control unit 75 previously described include the control knob 66 with its optional indicator 67 and the orifice 68.

The control unit 75 further comprises a tubular portion attached at its lower end to the control knob 66, with the orifice 68 in the control knob providing access to the interior of the tubular portion. The exterior of the tubular portion of the control unit 75 consists of an upper threaded section 76 and a lower threaded section 77, the two sections having different thread pitches. The two threaded sections 76 and 77 are separated by a non-threaded midsection 78 which has two (or more) holes 79 in it. The holes 79 are about 3 mm in diameter, and are spaced equidistantly around the midsection 78.

The holes 79 in the non-threaded midsection of the control unit 75 are not intended to serve as flow metering apertures. They are desirably sufficient in size and number to provide a total open area exceeding that of the solution metering aperture at its maximum intended gap setting.

When the standpipe elements illustrated in FIG. 3 are fully assembled, the upper threaded section 76 of the control unit 75 is screwed into the threaded upper insert ring 70, and the lower threaded section 77 is screwed into the corresponding threads of the flanged lower insert ring 71. The control unit 75 should be constructed with the outside diameter of the upper threaded section 76 being slightly smaller than that of the lower threaded section 77. This design feature allows the upper threaded section 76 to slip through the lower flanged insert ring 71 for easy assembly of the standpipe elements.

Turning the control knob 66 in the assembled standpipe illustrated in FIG. 2 causes upper standpipe portion 61 to move along its vertical axis, increasing or decreasing the gap between the mating ends of the upper and lower standpipe portions 61 and 62 depending on the direction the control knob 66 is rotated. The rate or degree of vertical travel between the two standpipe portions depends on the difference between the thread pitches selected for the upper threaded section 76 and lower threaded section 77.

The holes 79 of the control unit 75 in the assembled standpipe are located at the point where the upper standpipe portion 61 meets the lower standpipe portion 62. Consequently, concentrated chlorine solution (in contact with the alkali metal dichloroisocyanurate inside the apparatus housing) first passes through the filter medium covering, then flows at a controlled rate through the solution metering aperture in the standpipe, and next passes through the holes 79 in the control unit 75 into the interior of the standpipe.

The degree of chlorination obtained with the apparatus of this invention is precisely controlled by adjusting the control knob 66 which in turn varies the gap between the upper standpipe portion 61 and lower standpipe portion 62, i.e., the solution metering aperture.

EXAMPLE

The effectiveness of the apparatus of this invention in providing controlled chlorination of swimming pool water, using sodium dichloroisocyanurate dihydrate as the chlorinating agent, is demonstrated in the following example. The example is intended to be illustrative of the invention and should not be construed as limiting the apparatus as defined in the claims.

The apparatus of this invention, in particular, the embodiment illustrated in FIG. 1, was used to chlorinate a 20,000 gallon residential swimming pool over a period of 16 days. The swimming pool water purity was maintained by circulating the water through a conventional diatomaceous earth filtration system for twelve continuous hours each day. The apparatus was placed in the constant-level water reservoir of an E-Z Chlor Model R3AF chlorinating device (manufactured by Airwick Pool Products Inc., St. Peters, MO. 63376), which was installed in the filtration system in parallel to the filter.

The apparatus used in this example had a standpipe with characteristics similar to those described previously for the apparatus illustrated in FIG. 1. The 20 cm long standpipe had three solution metering apertures and three water inlet apertures, the apertures each having a diameter of about 2 mm. The solution metering apertures and water inlet apertures were located approximately 1 cm and 6 cm, respectively, from the attached lower end of the standpipe. The orifice in the bottom of the housing was a hole having a diameter of 3 mm.

The standpipe was covered with a filter medium sleeve, made of polyester felted filter cloth available from GAF Corporation under the designation 61PE18 and having a weight of about 18 oz/ft$^2$ (0.61 kg/m$^2$) and an air porosity of 25 ft$^3$/min/ft$^2$ (7.5 m$^3$/min/m$^2$) at 0.5 in. water.

The apparatus was charged with 48 ounces (1.36 kg) of Clearon® granular sodium dichloroisocyanurate dihydrate (distributed by FMC Corporation, Philadelphia, Pa).

The swimming pool was used in a conventional manner for swimming and the water temperature was maintained at 80° F. (27° C.) with a pool heater. The pH of the pool water was corrected to 7.5 ($\pm$0.1) with hydrochloric acid. Water hardness was 280 ppm; alkalinity was 120 ppm. The chlorine level sought under these conditions was from 1.0 to 1.5 ppm available chlorine.

In operation over a 7-day period, the apparatus of this invention resulted in a relatively satisfactory and constant chlorine level, 1.5 ppm residual chlorine in the pool water. This chlorination rate was equivalent to a chlorine consumption rate of approximately 3 ounces (85 gm) per day of sodium dichloroisocyanurate dihydrate. Recharging of the apparatus thus became necessary only after a two-week chlorination period when the charge had become completely consumed.

When the apparatus was subsequently modified by enlarging the three solution metering apertures to 3 mm in diameter (from the original 2 mm), the chlorination rate increased and yielded a relatively constant chlorine level of 1.5 to 2.0 ppm available residual chlorine in the pool water after a few days of operation.

I claim:

1. Apparatus for dispensing an alkali metal dichloroisocyanurate into a water supply to chlorinate the water, which comprises:
    (a) a housing for holding a supply of the alkali metal dichloroisocyanurate, at least the bottom of the housing being in contact with the water to be chlorinated;
    (b) a standpipe disposed within the housing, attached at its lower end to the housing bottom and extending upwardly therefrom, (i) the standpipe having at least one solution metering aperture located in its wall proximately to the attached lower end of the standpipe and at least one water inlet aperture located in its wall remotely from the attached lower end, and (ii) access of water from outside the housing to the standpipe interior being provided for by an orifice in the housing bottom;
    (c) means on the housing for use in supporting the housing in the water to be chlorinated so as to control the immersion depth of the housing in the water and thereby maintain in normal use water in the standpipe at a level sufficient to cover both the solution metering and water inlet apertures; and
    (d) a filter medium covering fitted over the standpipe exterior so as to cover the solution metering and water-inlet apertures in the standpipe wall;
the rate of chlorination being controlled by provision of solution metering apertures of such size and number so as to provide and active chlorine concentration in the water supply of from 0.5 to 5 ppm.

2. The apparatus of claim 1 a flotation collar attached to the housing.

3. The apparatus of claim 1 wherein the solution metering apertures are of such size and number to provide a total open area of 2 to 25 mm$^2$.

4. The apparatus of claim 3 wherein the number of solution metering apertures is from 1 to 10.

5. The apparatus of claim 1, 3 or 4 further comprising means for adjusting the size of the solution metering apertures.

6. The apparatus of claim 1 wherein the water inlet apertures number between 1 and 10 and are of such size as to provide a total open area of from 2 to 50 mm$^2$.

7. The apparatus of claim 1 wherein the filter medium covering is fabricated from a material selected from the group consisting of felted polyester and felted polyethylene filter media having a weight of from 10 to 25 ounces per square yard and an air permeability of from 10 to 60 cfm air/ft$^2$ at 0.5 inch water pressure.

8. The apparatus of claim 7 wherein the filter medium covering is fabricated from felted polyester filter media having a weight of about 18 ounces per square yard and an air permeability of about 15 to 30 cmf air/ft$^2$ at 0.5 inch waterpressure.

9. The apparatus of claim 1 where in the alkali metal dichloroisocyanurate is sodium dichloroisocyanurate dihydrate in granular form.

* * * * *

UNITED STATES PATENT AND TRADEMARK OFFICE
CERTIFICATE OF CORRECTION

PATENT NO. : 4,181,702
DATED : January 1, 1980
INVENTOR(S) : Clyde D. Watson

It is certified that error appears in the above-identified patent and that said Letters Patent are hereby corrected as shown below:

In claim 2 at column 16, line 8, the words --further comprising-- should be inserted after the words "claim 1".

Signed and Sealed this

Eighth Day of April 1980

[SEAL]

Attest:

SIDNEY A. DIAMOND

Attesting Officer

Commissioner of Patents and Trademarks